July 26, 1932.  G. M. AGEE  1,869,037
ATTACHMENT FOR FLUID METERS
Filed Sept. 2, 1930
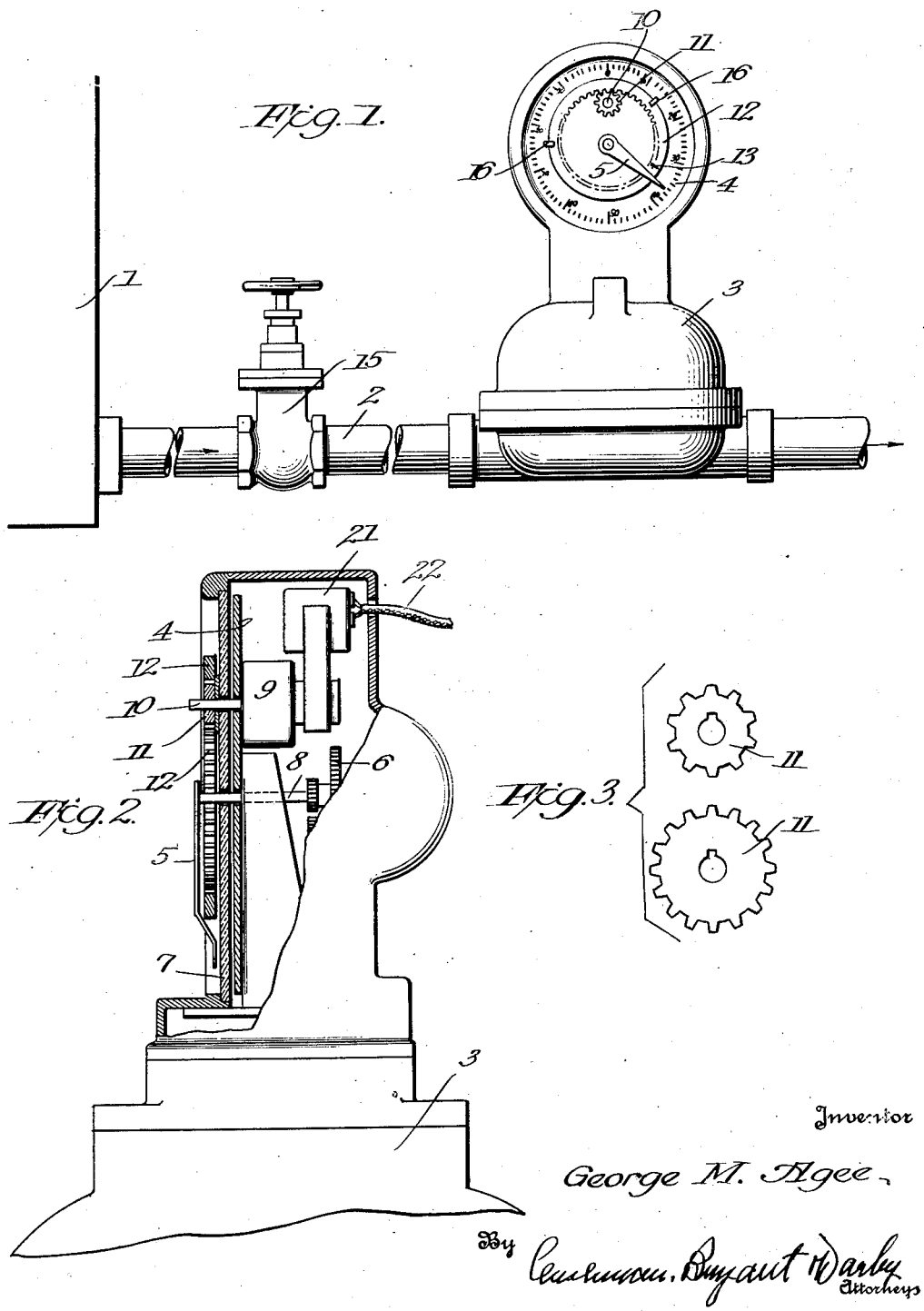

Patented July 26, 1932

1,869,037

UNITED STATES PATENT OFFICE

GEORGE M. AGEE, OF OWENSBORO, KENTUCKY

ATTACHMENT FOR FLUID METERS

Application filed September 2, 1930. Serial No. 479,353.

The present invention relates to improvements in attachments for fluid meters and particularly to an attachment whereby the amount of fluid flowing through a meter in a definite period of time may be readily ascertained.

The particular embodiment of the invention hereinafter more particularly described has been found to operate efficiently, and to be very useful, in connection with apparatus for preparing sweetened animal foods.

In the preparation of such it is customary to mix molasses with comminuted grain or suitable fodder material and it is important that the operator be able to readily determine that the proper proportion of molasses is being supplied to the mixing apparatus.

It is customary to place a fluid meter in the pipe line through which the molasses is supplied to the mixing apparatus, but with ordinary meters it is somewhat difficult for the operator to definitely know that the desired proportion of molasses is being supplied at any particular time, it being of course appreciated that the amount of molasses should be varied according to the character of the food to be produced, the amount of the grain content of such food, etc.

In the accompanying drawing:

Fig. 1 is an elevation of a construction embodying the present invention;

Fig. 2 is a view, partly in vertical section, through the meter;

Fig. 3 illustrates in detail two inter-changeable elements of the transmission means.

Referring to the drawing, in the several figures of which like parts are designated by the same reference character, 1 represents a tank or receptacle for fluid from which leads a delivery pipe 2 the outlet end of which may be connected with, for example, a mixing apparatus.

If the improvements are used in connection with apparatus for preparing a sweetened animal food, the tank or receptacle 1 may be provided with a suitable pump for forcing the fluid through the pipe 2, or in some instances said receptacle may be elevated above the mixing apparatus and the fluid allowed to flow by gravity through said pipe.

In the pipe line 2 is arranged a suitable meter 3 which has an indicating means comprising a circular graduated dial 4 and a revoluble hand or pointer 5. The indicating means referred to, and illustrated conventionally, may be of any well known type and the hand or pointer 5, as usual, is actuated by gearing that is set in motion by the flow of fluid through the meter.

As any suitable form of meter may be employed, the drawing merely shows the casing thereof and a portion of the train of gearing, 6, which is interposed between the hand operating shaft and the movable parts which are actuated by the flow of fluid.

As shown the indicating means of the meter represents the amount, in pounds, of fluid flowing through the meter, the dial 4, being divided into one hundred graduations, and the pointer 5 makes a complete revolution for each one hundred pounds of fluid that passes through the meter.

As shown a transparent plate 7 is arranged in the meter casing in front of the graduated dial plate 4 and the hand or pointer 5 is mounted on the outer end of a shaft 8 which extends through said plates. Within the meter casing, above the shaft 8 is suitably supported a clock or time mechanism which is connected to a shaft 10, that projects outward through the plates 4 and 7.

Any suitable form of clock mechanism may be provided, it merely being necessary that the shaft 10 be driven at a constant predetermined speed. In the embodiment of the invention illustrated, an electrical driven clock mechanism is illustrated more or less diagrammatically, the actuating motor 21 being connected with a suitable conductor 22. It will be understood that a spring or weight actuated clock or any mechanical movement which will impart a positive drive to the shaft 10 at a definite speed may be employed instead of the electrically actuated or controlled mechanism shown.

Preferably the timing mechanism will be such that the shaft 10 will make one revolution per minute.

On the shaft 10 in advance of the plate 7 is secured, so as to rotate with said shaft, a pinion 11 and suspended from and meshing with the teeth of the pinion 11 is an internally toothed gear 12. The number of teeth in the gear 12 corresponds with the number of graduations on the dial plate 4, namely one hundred in the particular embodiment of the invention being described, and said gear will be turned at each rotation of the shaft 10 a distance corresponding to the number of teeth on the pinion 11. If for example the pinion 11 contains 8 teeth, the gear 12 will be moved a distance of 8 teeth at each revolution of the shaft 10.

The pinion 11 is removably mounted on the shaft 10, and the invention includes providing a series of such pinions the number of teeth of each, differing from the number of teeth of the others. For example, a series of ten pinions, severally provided with 8—10—12—14—15—16—18—20—24— and 27 teeth may be supplied and the operator will select and mount on the shaft 10 the proper pinion 11 according to the number of pounds of molasses, for example, it is desired to supply, per minute, to the mixing apparatus.

On the face of the gear 12 is a suitable mark or indication 13, and by the cooperation of such mark and the meter hand 5 it is possible to readily determine whether or not the flow of fluid through the pipe line 2 corresponds to that which is desired.

In the pipe 2 between the source of supply and the meter 3 is arranged a suitable control valve 15, by which the amount of fluid supplied to the meter can be varied as necessary, or entirely cut off.

The gear 12 is supported by the pinion 11 and a plurality of suitable guides 16 may be provided for maintaining it in substantial parallelism with the meter dial plate.

Assuming that the improvements are employed in connection with a meter in the pipe line for supplying molasses to an animal food mixing apparatus and that it is desired to furnish to said apparatus 8 pounds of molasses per minute, the operator will apply a pinion 11 containing 8 teeth to the shaft 10.

On opening the regulating valve 15, molasses will flow through the meter, and hand or pointer 5 will be moved step by step over the graduated dial 4. At the same time the gear 12 will be rotated through the action of the clock-driven shaft 10 and pinion 11.

By observing the relation between the indicator 13 on the gear 12 and the meter hand 5 the operator can at a glance determine whether or not the desired rate of flow of molasses is being maintained. If the relative positions of the indicator 13 and pointer 5 remain constant, the operator will know that 8 pounds per minute of molasses is flowing through the meter. If the relation of the indicator 13 to the pointer 5 should vary, the operator will know that either less or more than the desired amount of molasses is flowing through the meter and will operate the control valve 15 accordingly.

While the invention has, as before referred to, been found particularly adapted for use with apparatus for preparing sweetened animal food and in indicating the rate of flow of molasses through a meter, it will be appreciated that the invention is not limited to such particular use. It is believed that the improvements are applicable to any fluid meter wherein it is desired to provide a ready means for disclosing whether or not a certain amount of fluid is flowing through the meter in a definite, predetermined, unit of time.

In the drawing parts are shown more or less diagrammatically, and there can of course be modification of the details shown without departing from the invention. The drawing is intended to be illustrative, rather than restrictive of the invention, and except as noted in the appended claims the invention is not to be understood as being limited to the exact arrangement shown.

I claim:

1. The combination with a fluid meter indicating means, comprising a relatively movable pointer and graduated dial, of a clock-driven shaft, a pinion on said shaft, a gear meshing with the pinion, the teeth of said gear corresponding in number to the graduations on the meter dial, and means carried by said gear adapted in cooperation with the pointer of the meter to indicate the relation between a desired predetermined quantity of fluid and the amount of fluid actually flowing through the meter in a definite interval of time.

2. The combination with a fluid meter indicating means, comprising a relatively movable pointer and graduated dial, of a clock-driven shaft, a pinion on said shaft, an internally toothed gear suspended from and meshing with the pinion, the teeth of said gear corresponding in number to the graduations on the meter dial, and means carried by said gear adapted in cooperation with the pointer of the meter to indicate the relation between a predetermined quantity of fluid and the amount of fluid flowing through the meter in a definite interval of time.

3. The combination with a fluid meter indicating means, comprising a relatively movable pointer and graduated dial, of a clock-driven shaft, a set of changeable pinions each having a series of teeth differing in number from the others, and each being adapted to be alternately supported on said shaft in operative relation thereto, a gear meshing with the pinion on the shaft, the teeth of said gear corresponding in number to the graduations on the meter dial, and means carried by said gear adapted in cooperation with the pointer of the meter to indicate the relation between a predetermined quantity of fluid and the amount of fluid flowing through the meter in a definite interval of time.

In testimony whereof I have hereunto set my hand.

GEORGE M. AGEE.